July 9, 1929.  C. SKLAREK  1,719,907
ADJUSTABLE LIGHT MOUNTING
Original Filed May 8. 1922   2 Sheets-Sheet 1
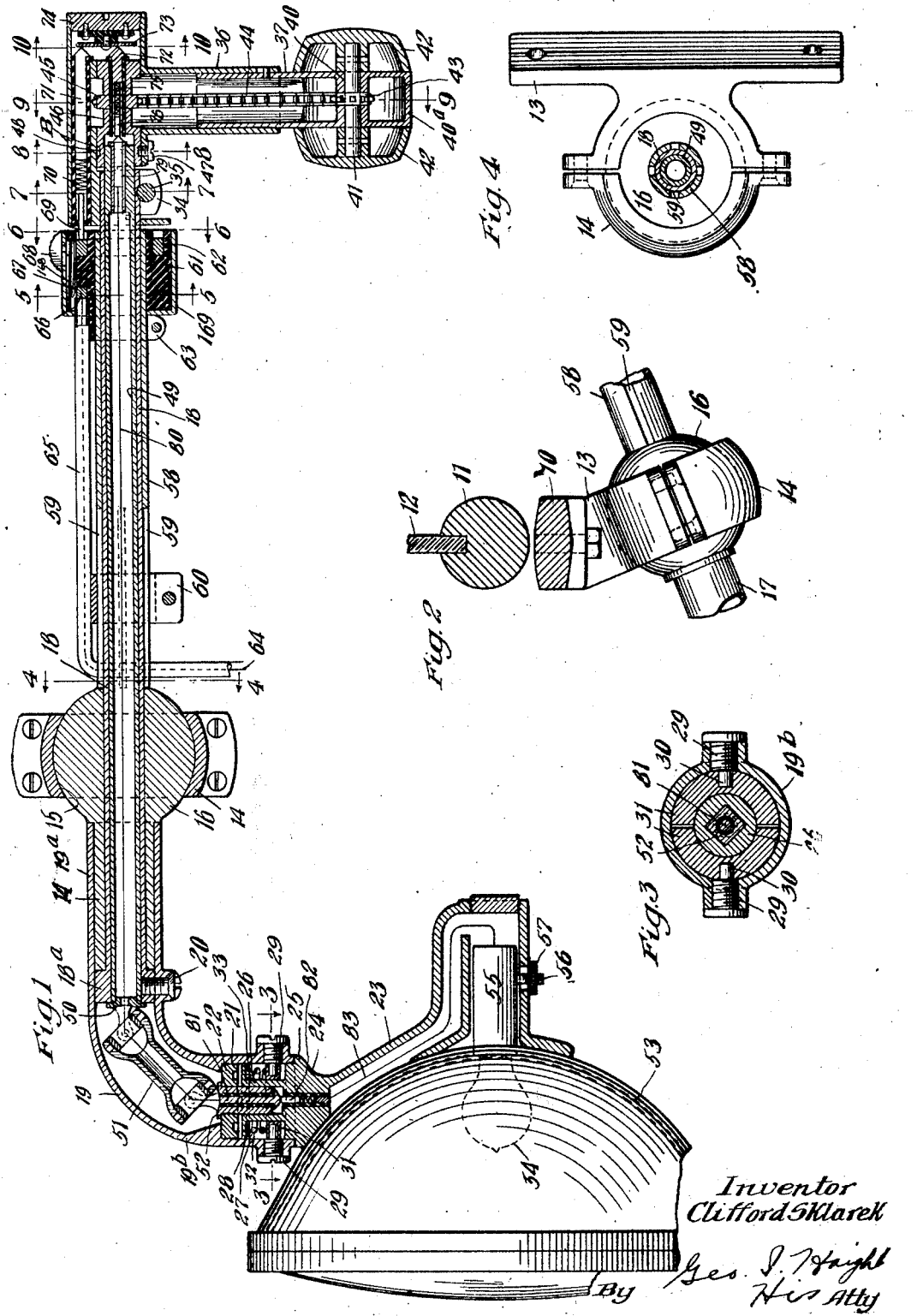
Inventor
Clifford Sklarek July 9, 1929.  C. SKLAREK  1,719,907
ADJUSTABLE LIGHT MOUNTING
Original Filed May 8. 1922  2 Sheets-Sheet 2
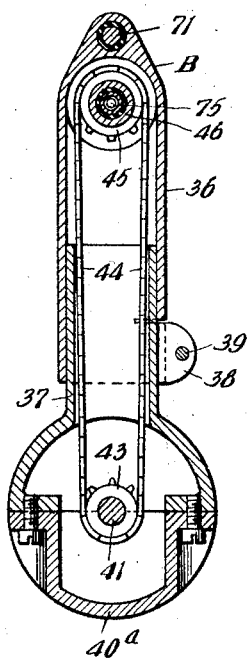
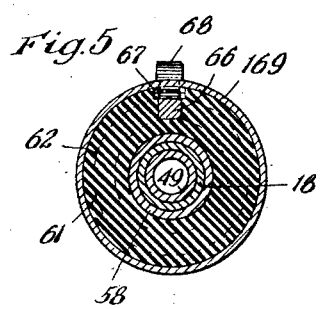
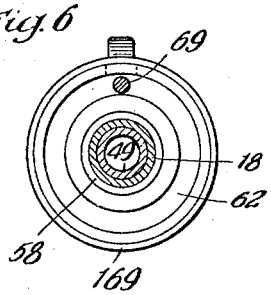
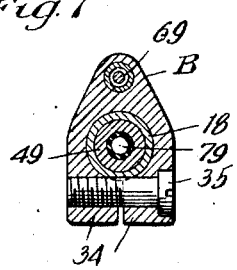
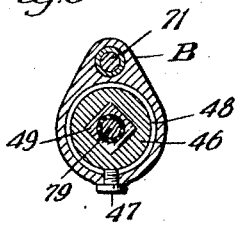
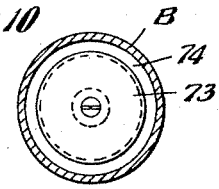
Inventor
Clifford Sklarek
By Geo. I. Haight
His Atty.

Patented July 9, 1929.

1,719,907

UNITED STATES PATENT OFFICE.

CLIFFORD SKLAREK, OF CHICAGO, ILLINOIS, ASSIGNOR TO INTERNATIONAL SPOTLIGHT CORPORATION, OF CHICAGO, ILLINOIS, A CORPORATION OF ILLINOIS.

ADJUSTABLE LIGHT MOUNTING.

Application filed May 8, 1922, Serial No. 559,123. Renewed June 28, 1928.

This invention relates to improvements in adjustable light mountings.

One object of the invention is to provide a universally adjustable light especially adapted for use as a spotlight for automobiles, trucks, etc., and more particularly such a light which may be adjusted manually by the actuation of a single member.

Another object of the invention is to provide a light mounting of the character described, which is of economical construction, and the adjustments of which may be effected with minimum effort.

In the drawings forming a part of this specification, Figure 1 is a vertical, sectional view taken lengthwise of the improved adjustable light mounting and showing the invention incorporated in a spotlight adapted for application to the windshield structure of an automobile. Figure 2 is a horizontal sectional view taken in a plane somewhat above the spotlight illustrated in Figure 1. And Figures 3 to 10, inclusive, are sectional views corresponding to the respective section lines 3—3 to 10—10, inclusive, of Figure 1, the various section being taken in the directions indicated by the different arrows.

In said drawing, 10 denotes one of the corner posts of an automobile superstructure, 11 a section of the usual windshield frame and 12 a portion of the windshield glass. In carrying out my invention, the spotlight is supported preferably from the post 10 by means of a support consisting of a bracket 13 bolted or otherwise rigidly attached to the post 10, and a cap plate 14 attached to the bracket 13 by screws or other suitable fastening devices. The bracket 13 and plate 14 are so formed, on their interior surfaces, as to provide a zone of a sphere as indicated at 15 to thereby permit the use of a ball-shaped casting 16. With this construction, it is evident that the ball casting 16 may be clamped in any desired adjusted position so that the support may be applied to any type of windshield structure, regardless of its slope and still have the spotlight extend horizontally and at the proper or desired angle toward the operator.

The ball-shaped casting 16 has an outwardly extended hollow arm 17 formed integral therewith, said arm 17 and the main section of the ball being recessed to provide a bearing for a hollow sleeve 18. The latter is shouldered at its front or outer end as indicated at $18^a$ and bears against the end of the arm 17 to thereby limit the movement of the sleeve 18 toward the right, as viewed in Figure 1. Secured to the enlarged end $18^a$ is a tubular member 19 having a horizontally extending portion $19^a$ and a 90° curved portion $19^b$, the rigid connection between the sleeve 18 and member 19 being effected by a set screw 20.

At its lower end, the tubular member 19 is suitably thickened to provide the necessary metal and the same is interiorly threaded as indicated at 21 to receive a threaded plug 22. A second member or lamp-carrying casting 23 is rotatably mounted on the free end of the tubular member 19 preferably by the following means. The member 23 has an integral lug 24 formed with an annular shoulder 25 which normally bears against the free edge of the tubular member 19. Beyond the shoulder 25, the lug 24 is extended within the tubular member 19 and has a section 26 of reduced diameter thereby leaving an annular groove 27 and a top flange 28. Supported at the lower end of the tubular member 19 (see Figures 1 and 3) by screws 29—29 having inner pin ends 30, are two semi-annular plates 31—31. The latter are accommodated within the annular groove 27 of the lamp-holding member and between the semi-annular plates 31 and the top flange 28 is interposed an expansion coil spring 32, there preferably being a friction washer 33 between the spring and the flange 28. With this arrangement, it is evident that the lamp-carrying member 23 is freely rotatable on the member 19 about an axis at right angles to the axis of rotation of the member 19 within the ball 16 and furthermore, that the swivel connection hereinbefore described is such as to always yieldingly hold the shoulder 25 of the lamp-holding member against the lower edge of the tubular member 19. On account of the yielding support and the fact that the spring 32 will be placed under considerable compression when the parts are assembled, rattle or vibration is substantially eliminated.

To effect rotation of the tubular member 19 about the axis of its sleeve 18, I preferably employ the following arrangement. Secured to the inner or righthand end of the sleeve 18, as viewed in Figure 1, is a block B, the parts being secured together preferably by splitting the block as shown at 34—34 in Figure 7 and clamping the same about the tubular sleeve as by the screw 35. The block B is formed with a hollow radially extending arm 36 within which is telescoped a second hollow tube 37. The latter is held in lengthwise adjusted position with respect to the arm 36 preferably by providing the arm 36 with radially extended flanges 38—38 adapted to be clamped together to frictionally grip the tube 37 as by a screw 39.

The tube 37 is provided with an integral semi-bearing 40 for a transversely extending shaft 41 to the outer ends of which are attached hand wheels or knobs 42—42. The other half of the bearing is provided by a removable cap 40ª. By grasping the handle formed by the knobs 42—42 and swinging the radially extending arm from the block B, bodily, it is evident that rotation of the sleeve 18 and tubular member 19 may be effected.

To effect independent rotation of the light-carrying member 23 about its individual axis, I preferably employ the following arrangement. Secured to the shaft 41 is a sprocket gear 43 (see Figure 9) with which cooperates a sprocket chain 44, the latter also taking over a second sprocket gear 45. The latter is preferably formed integral with a small block or transmitting member 46 which is rotatably mounted within the block B and held against endwise movement by means of the screw 47 which enters an annular groove 48 formed in the block 46. The lefthand end of the small block or transmitting member 46, as viewed in Figure 1, is provided with a polygonal recess for the detachable reception of the adjacent polygonal end of a hollow shaft 49 (see Figure 8) which is rotatably mounted within the sleeve 18. The lefthand end of the shaft 49, as viewed in Figure 1, has secured thereto a forked plate 50 which has a universal joint connection with a hollow link 51, the latter in turn having another universal joint connection with a block 52 which is non-rotatably connected with the lug 24 of the lamp-holding member 23. By rotating the knobs 42—42 about the axis of the shaft 41, it is evident that rotation will be imparted to the rigid shaft 49 and such rotation communicated through the universally jointed links or flexible shaft section of the lamp-holding member 23. With the arrangement described, a method of obtaining the universal adjustments of the light is obviously provided, requiring only the one hand of the operator.

The lamp-holding member 23 has secured thereto a reflector 53 of any desirable type and carries also an electric light proper or bulb 54. Preferably the latter is secured to a base 55 which is adjustably mounted with respect to the holding member 23 as by a screw 56 and set nut 57. In order to supply the bulb 54 with the necessary current and at the same time provide a thoroughly weather-protected system and one having an easily manipulated switch, I provide the following arrangement. The ball member 16, to the right thereof as viewed in Figure 1, is provided with a hollow rigid arm 58, said arm 58 providing an elongated bearing for the sleeve 18 and shaft 49 therewithin. Preferably the hollow arm 58 is longitudinally slotted for a distance adjacent the ball as indicated at 59—59 and a bent friction clamp 60 applied therearound so that the friction between the arm 58 and the sleeve 18 may be made sufficient to prevent any accidental or unintentional turning of the movable lamp parts as might otherwise be caused from vibration. Secured to the righthand end of the rigid arm 58, as viewed in Figure 1, is a block of insulation 61 within which is set an annular contact ring 62. Said block of insulation 61 is held in adjusted lengthwise position by a split collar clamp 63. Electricity is supplied from the battery through a wire 64 which is preferably led to the block of insulation 61 through an armored cable 65. The terminal of the wire 64 is in a contact 66 and a switch between said contact 66 and the annular contact ring 62 is obtained by means of a spring 67, one end of said spring being soldered or otherwise secured to the contact ring 62. The free end of the spring 67 is adapted to be pressed down into contact with the terminal 66 by a slide push button 68, which operates an insulating plate 168. The button 68 is mounted in a casing 169 enclosing the block of insulation 61.

Mounted in the block B is a spring-pressed contact pin 69 adapted to have engagement with the contact ring 62 in any adjusted position of the block B and associated operating handle. Electrical connection is effected from the pin 69 through a spring 70 and pin 71 mounted in suitable insulation within the block B. A headed insulated contact pin 72 is mounted in the small block 46 and the circuit between the pins 71 and 72 completed by a spring plate 73 insulated from and carried by a plug 74 adapted to close the outer end of the block B. From the contact pin 72, electrical connection is continued through the spring 75 and spring-pressed pin 76 to a headed insulated contact pin 79 mounted in the end of the shaft 49. A wire 80 leads from the contact pin 79 through the hollow shaft 49 and through the hollow universally jointed links to a contact pin 81 mounted within the block 52. The contact pin 81 has electrical connection with an insulated spring-pressed pin 82 and from the latter is run a wire 83 to the base block of the light 54. The opposite side of the circuit is of course completed by having the parts grounded. With the arrangement just described, it will be evident that the electrical connections are operative under all positions of the parts and without any danger of any wire becoming twisted or kinked, regardless of the number of full turns which may be given to any rotating part. It will further be noted that the switch button is conveniently placed so that the operator may use a finger of the same hand used in adjusting the light to either throw on or off the current. All of the parts are so designed that the entire device may be shipped in assembled condition and directly applied to the post of the car superstructure. Where the arrangement is to be employed in a closed type of car, the design of the parts is such that certain of them may be readily taken apart and passed through a suitable bearing provided in the corner post of the car superstructure and the parts reassembled without difficulty and without any special skill or tools.

I claim:

1. In an adjustable light, the combination with a support; of a carrier having a rigid hollow sleeve and rotatable on said support about the axis of said sleeve; a second carrier mounted on said first carrier to rotate about an axis different from said first axis; a shaft rotatably mounted in said hollow sleeve, said shaft having one of its ends operatively connected to said second carrier; and means for imparting rotation to said sleeve and to said shaft including, an arm rigid with said sleeve and extending laterally therefrom, a hand wheel on the outer end of said arm mounted for rotation about an axis parallel to the axis of rotation of said shaft and driving connections between said hand wheel and shaft for producing rotation of the latter when said hand wheel is rotated about its individual axis.

2. In an adjustable light, the combination with a support; of a carrier having a rigid hollow sleeve and rotatable on said support about the axis of said sleeve; a second carrier mounted on said first carrier to rotate about an axis different from said first axis; a shaft rotatably mounted in said hollow sleeve, said shaft having one of its ends operatively connected to said second carrier; and means for imparting rotation to said sleeve and to said shaft including, a telescopic arm extending radially from said sleeve, a hand wheel rotatably mounted about an axis transverse to said arm at the outer end of the latter, a sprocket gear rotatable in unison with said hand wheel, a sprocket gear rigid with one end of said shaft, and a sprocket chain extending between and cooperating with said sprocket gears.

3. In a dirigibly mounted light, the combination with a support; of a hollow carrier rotatably mounted on one axis; a lamp holding member swiveled to one end of said carrier for rotation about an axis angularly disposed to said first named axis; a sleeve rotatable within said carrier and having one end thereof operatively connected to said lamp holding member; means for rotating said carrier means for rotating said sleeve; an insulated lead-in block rigidly mounted on said support; a contact ring and a spaced contact member on said block; a hand operated switch on said block making and breaking the circuit between said member and ring; and means for completing an electric circuit from said ring through said sleeve to the lamp proper.

4. In a dirigible spotlight and mounting therefor, the combination with a two-part bracket, each part having a partly segmental seat formed therein, the seats together defining an interior socket corresponding to the zone of a sphere, one of the parts of said bracket having means thereon for securing the same to a relatively fixed support; of means for clamping together the parts of the bracket; a bearing sleeve member having an exterior ball section intermediate its ends, said ball section fitting said socket of the bracket and adapted to be clamped thereby in any desired adjusted position; a lamp head supporting member rotatably mounted on the outer sleeve section of said sleeve member; an operating shaft journaled within said sleeve member and operatively connected, at its outer end, to said lamp head supporting member to effect rotation of the latter; and an operating handle connected to the inner end of said operating shaft whereby to effect rotation of said shaft within the ball sleeve member.

In witness that I claim the foregoing I have hereunto subscribed my name this 2nd day of May, 1922.

CLIFFORD SKLAREK.